United States Patent Office 3,240,807
Patented Mar. 15, 1966

3,240,807
PREPARATION OF B-HALOGENATED PHOSPHINOBORINE POLYMERS
Ross I. Wagner, Whittier, and Marvin H. Goodrow, Claremont, Calif., assignors to American Potash & Chemical Corporation, Los Angeles, Calif., a corporation of Delaware
No Drawing. Filed Apr. 30, 1962, Ser. No. 191,272
13 Claims. (Cl. 260—543)

The present invention relates, in general, to the preparation of phosphinoborine polymers in which the boron atoms are halogenated. More specifically, the invention relates to the preparation of B-halogenated phosphinoborine polymers by reacting certain phosphinoborines with certain electropositive halogen containing compounds.

It is known that phosphinoborine polymers are of value as high temperature dielectric materials. When one or more halogen atoms are bonded to the boron atoms of such phosphinoborines, the polymers then have even better characteristics. Thus, they have higher melting points and greater oxidative stability than the corresponding non-halogenated phosphinoborines. Therefore, they can be used in applications where only the most high melting of the phosphinoborine materials can be employed. For example, one such application is as a dielectric material where extremely high temperatures or corrosive chemicals are encountered. These halogenated polymers also serve as intermediates for the production of substituted polymers as is more specifically described in assignee's copending application Serial No. 191,296 filed of even date herewith.

The preparation methods heretofore available for the manufacture of the B-halogenated phosphinoborine compounds are, in certain respects, more difficult to carry out than are the preparative methods available for the manufacture of the corresponding non-B-halogenated phosphinoborine compounds.

Broadly, in accordance with the present invention, it has been determined that B-halogenated phosphinoborine polymers can be prepared by treating the preformed polymers with certain electropositive halogen compounds. The process is applicable to the preparation of partially and completely B-halogenated phosphinoborine polymers.

More specifically, the process of the present invention comprises reacting—

(I) A B-hydridophosphinoborine polymer having any of the general formulas:

(1) $[R_4R_3PBR_1R_2]_n$
(2) $[R_4R_3PBR_1R_2]_nA$
(3) $[R_2R_1BP(R_3)R(R_3)PBR_1R_2]_n$
(4) $[R_4R_3PBR_1R_2]_m[R_3PBR_1]_z$ mixtures and copolymers thereof, with (II) An electropositive halogen compound.

An electropositive halogen compound is defined as a compound which upon reaction with hydriodic acid liberates free iodine from the hydriodic acid. An electropositive halogen atom is one which is attached to a group which is more electronegative than the specific halogen atom. When attached to such a group a halogen atom assumes an electropositive character.

Since it is difficult and often impossible to calculate or predict, even with the aid of such authorities as "The Nature of the Chemical Bond" by Linus Pauling, whether a particular compound contains electropositive halogen the most desirable procedure is to test the compound to see if it liberates iodine from hydriodic acid. If the halogen containing compound releases iodine in the reaction, it contains electropositive halogen; if it does not liberate iodine, it does not contain electropositive halogen.

In the above formulas $R_1$ and $R_2$ are each independently taken from the following group: hydrogen and monovalent alicyclic, acyclic or arene substituents; at least one of said $R_1$ and $R_2$ being hydrogen in each of said (1), (2), (3), and (4), each $R_1$ and $R_2$ substituent being independently selected for each monomeric unit. The substituents, $R_3$ and $R_4$, can be any of the single monovalent alicyclic, acyclic or arene substituents; or taken together as one single bivalent alicyclic, acyclic or arene substituent. The substituent, R, can be any of the bivalent alicyclic, acyclic or arene substituents. The integer, $n$, is indicative of the degree of polymerization of the polymers. The ratio of the integers, $m$ to $z$, in the polymer (4) is indicative of the extent of ring fusion and is between about 0.1:1 and about 6:1. The terminal groups of linear polymer (2) on the boron end of the chain are broadly basic in nature, designated —A, and can conveniently be tertiary amines, tertiary phosphines, secondary amines or secondary phosphines. While we do not wish to be limited to any theory, it is believed that the other end of the polymer (2) is blocked by an acidic group, $-B(R_1)_3$, wherein $R_1$ is as defined above.

The B-halophosphinoborine polymers can be recovered, for example, from this reaction as a liquid, a solid, a solution dissolved in a suitable solvent, or as a solid precipitate. The recovered B-halogenated polymer can be isolated by conventional isolation procedure, such as crystallization, filtration, and the like.

The halogenation process of the present invention is characterized by the fact that it does not affect the polymeric nature of the phosphinoborines being treated. Thus, when the phosphinoborine compound being treated is initially a linear polymer, it remains such after halogenation in accordance with the present invention. Similarly, when the phosphinoborine compound being treated is initially a cyclic polymer, it remains cyclic following treatment with the halogenating agent and exhibits general properties common to cyclic phosphinoborine polymers.

The N-halocarbamyl compounds, which are the preferred electropositive halogen compounds, employed in carrying out the process of the present invention can be represented conveniently by the formulas:

(1)
(2)

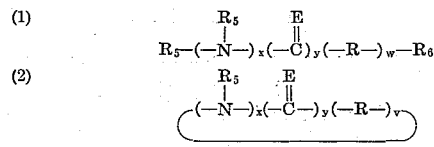

the substituents

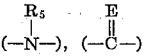

and (—R—) can be arranged in any order provided at least one

substituent is positioned adjacent to at least one

substituent in each of said (1) and (2). $w$ and $v$ are intergers indicative of the number of (—R—) substituents in the compound, $w$ can range from 0 to $(x+y-2)$ and $v$ can range from 1 to $(x+y-1)$. $x$ and $y$ are integers indicating respectively the number of

and

substituents in the compound, their ratio being between 1:2 and 2:1. The substituent, $R_5$ is attached to the

substituent and can be any of the monovalent chlorine, bromine, iodine, hydrogen, $(R_1)_2N-$, alicyclic, acyclic or arene substituents, with the provision that at least one $R_5$ substituent in each N-halocarbamyl compound is a halogen. $R_6$ is attached to the

substituent and can be any of the monovalent $N(R_1)_2-$, hydrogen, alicyclic, acyclic or arene substituents. The substituent, R, is as defined above. E can be O, S or $NR_1$.

Examples of specific N-halocarbamyl compounds include, for example, the N-halo derivatives of phthalimide, phthalimindine, phthalylhydrazine, urea, hydantoin, 5,5-diemthylhydantoin, 1-ethylhydantoin, 5-ethyl-5-methylhydantoin, 5-methyl-5-isopropylhydantoin, 5-methyl-5-isobutylhydantoin, 1,2-cyclohexanedicarboximide, 1,2-cyclopentanedicarboximide, 2-pyrrolidone, biuret, acetamide, benzamide, formamide, heptanamide, oleamide, cinnamamide, 2-naphthamide, cyclohexanecarboxamide, cyclohexaneacetamide, diacetamide, dibenzimide, acetanilide, 3,6-dimethyl-2,5-piperazinedione, malonimide, citraconimide, succinimide, maleimide, naphthalimide, N-cyclohexylbenzenamide, adipamide, phthalamide, N,N'-methylenebisacetamide and 1,4-diacetamidonaphthalene. Preferred N-halocarbamyl compounds include the N-halosuccinimide, mono- and di-N-halosuccinamide, mono- and di-N-halohydantoins, mono- and di-N-haloacetamide. These preferred N-halocarbamyl compounds give good yields of product, do not undergo objectionable side reactions and provide a smooth halogenation reaction.

The cyclic B-hydridophosphinoborine polymer (1) having the formula $[R_4R_3PBR_1R_2]_n$, as described above, is conveniently prepared by the pyrolysis of a phosphine with a diborane in accordance with the following equation:

$$2R_4R_3PH + B_2H_6 \rightarrow R_4R_3PH:BH_3 \rightarrow [R_4R_3PBH_2]_n + H_2$$

This series of reactions is more specifically described in assignee's U.S. Patent No. 2,925,440, issued February 16, 1960. The preparation of the linear polymer (2) is very similar to this and is more specifically described in assignee's copending application Serial No. 802,615, filed March 30, 1956.

The B-hydridophosphinoborine polymer (3) having the formula $[R_2R_1BP(R_3)R(R_3)PBR_1R_2]_n$ is conveniently prepared by the following reaction:

$$HR_2R_1B:PH(R_3)R(R_3)HP:BR_1R_2 \xrightarrow{\Delta} [R_2R_1BP(R_3)R(R_3)PBR_1R_2]_n$$

This reaction is more specifically described in assignee's U.S. Patent No. 2,948,689, issued August 9, 1960.

The polycyclic fused ring B-hydridophosphinoborine polymer (4) having the formula $$[R_4R_3PBR_1R_2]_m[R_3PBR_1]_z$$

is conveniently prepared by the following reaction:

$$R_3H_2P:BHR_1R_2 + R_4R_3HP:BHR_1R_2 \xrightarrow{\Delta} [R_4R_3PBR_1R_2]_m[R_3PBR_1]_z$$

This preparation is described in greater detail in assignee's copending application Serial No. 680,625, filed August 27, 1957. As is more specifically set forth in that application, the character of this polycyclic fused ring polymer is conveniently described as the ratio of m to z. The greater z is with respect to m, the greater the number of ring fusions. As m approaches 0, the resulting polymer becomes more highly cross-linked, more fusible, insoluble and brittle.

The preparation of partially or completely halogenated phosphinoborine polymers is controlled as to the amount of halogen by adjusting the ratio of electropositive halogen compound to B-hydridophosphinoborine polymer. When it is desired to replace all of the B-hydrogen atoms on the polymer with halogen atoms, a chemically equivalent or slight excess amount of electropositive halogen compound is employed. If, for example, it is desired to convert one mole of phosphinoborine trimer, having the formula $[(CH_3)_2PBH_2]_3$, of the type indicated as (1) hereinabove, to its completely halogenated form, the trimer is reacted with six or more moles of mono-halo containing electropositive halogen compound. If, for the purpose of further illustration, it is desired to halogenate only half of this trimer, only three moles of mono-halo containing electropositive halogen compound would be employed for each mole of the trimer polymer.

In order to illustrate the invention even more clearly, the following specific examples are set forth. It will be understood, of course, that these examples are presented for illustrative purposes only and are not intended to limit the invention in any manner. In the following examples and throughout the specification and appended claims, all parts and percentages are by weight unless otherwise indicated.

Examples I through VI, inclusive, illustrate the preparation of the B-halophosphinoborine compounds from the polymer referred to hereinabove by (1), namely, mono-, di-, tri-, tetra-, penta-, and hexa- B-halogenated phosphinoborine trimers, and mono-, di-, tri-, tetra-, penta-, hexa-, hepta- and octa-B-halogenated phosphinoborine tetramers, and in general, partially or completely B-halogenated cyclic phosphinoborine polymers.

EXAMPLE I

A magnetically stirred mixture of 0.1310 g. (0.591 mmole) of dimethylphosphinoborine tirmer, $$[(CH_3)_2PBH_2]_3$$

and 0.5207 g. (3.90 mmoles) of N-chlorosuccinimide in 10 ml. of carbon tetrachloride is heated to reflux for 7 hrs. The mixture is cooled in an ice-salt bath and the insoluble product is collected. To assure complete removal of by-products, the precipitate is heated with 15 ml. of boiling water, filtered, dried and recrystallized from chloroform. There is obtained 0.2041 g. of dimethylphosphinodichloroborine trimer, M.P. 384–385° C.

EXAMPLE II

To a solution of 4.5322 g. (20.45 mmoles) of dimethylphosphinoborine trimer in 60 ml. of carbon tetrachloride is added 2.7860 g. (20.86 mmoles) of N-chlorosuccinimide. After stirring at room temperature for 8 hrs., filtration and evaporation of the filtrate to dryness provides 5.1382 g. of white crystalline partially chlorinated dimethylphosphinoborine trimers. Vapor phase chromatographic analysis on Apiezon L/Celite, shows the crude product to consist of 15.2% dimethylphosphinoborine trimer, 61.4% B-chloro-dimethylphosphinoborine trimer, 17.8% B,B' - dichloro - dimethylphosphinoborine trimer 1.4% trichloro-dimethylphosphinoborine trimer and 1.5% tetrachloro-dimethylphosphinoborine trimer.

A benzene solution containing approximately 0.2 g. of this mixture is chromatographed on a preparative vapor phase apparatus; the mono- and dichloro-derivatives are collected separately. Evaporation to dryness of the monochcloro-derivative yields 0.1004 g. of product, M.P. 72.5–74° C.

The benzene solution of the B,B'-dichloro-dimethylphosphinoborine trimer is evaporated to dryness and the residue is found to have the M.P., 86–97° C.

Utilizing the same procedure as in Example II and 3 mmoles of N-chlorosuccinimide per mmole dimethylphosphinoborine trimer, the following mixture of partially B-chlorinated dimethylphosphinoborine trimers are obtained: trichloro, 45.3%; tetrachloro, 39.3%; pentachloro, 3.3%.

EXAMPLE III

To 0.2056 g. (0.928 mmole) of dimethylphosphinoborine trimer in 10 ml. of heptane is added 1.0900 g. (6.12 mmoles) of N-bromosuccinimide. Heating under reflux for 2.5 hrs. causes the solution to turn light brown. After cooling, the insoluble material is collected, extracted with 15 ml. of boiling methanol, filtered and dried to give 0.4091 g. of crude dimethylphosphinodibromoborine trimer. Crystallization of the product from methylene bromide provides 0.2720 g. (42%) of pure material.

EXAMPLE IV

To a stirred solution of 1.6068 g. (7.2509 mmoles) of dimethylphosphinoborine trimer in 50 ml. benzene is added 2.5901 g. (14.55 mmoles) of N-bromosuccinimide dissolved in 100 ml. of hot benzene. After about half the material is added, a bromine color develops which gradually disappears over a period of several minutes. Following the addition of the N-bromosuccinimide the reaction mixture is refluxed for 5 min. After cooling to room temperature the mixture is evaporated to dryness under reduced pressure and the residue extracted three times (30 ml. each) with hot i-hexane. On evaporation, the extract gives 2.72 g. of crystalline solid, M.P. 105–125° C., which after several recrystallizations from i-hexane, gives 0.648 g. of pure B,B'-dibromo-dimethylphosphinoborine trimer, M.P. 129–131° C.

A stirred mixture of 2.1134 g. (11.75 mmoles) of N-bromosuccinimide and 0.6477 g. (2.923 mmoles) of dimethylphosphinoborine trimer in 50 ml. of benzene is rapidly brought to reflux. After refluxing for 3 hrs. the hot benzene solution is extracted with 50 ml. of water, dried over sodium sulfate, and evaporated to dryness to yield 1.467 g. of crystalline solid. This solid after 6 recrystallizations from cyclohexane yields 0.065 g. of needles, M.P. 208–209° C. The product is identified as B,B,B',B''-tetrabromo-dimethylphosphinoborine trimer.

EXAMPLE V

To a stirred solution of 0.3830 g. (1.733 mmoles) of dimethylphosphinoborine trimer is added dropwise a benzene solution of 0.3101 g. (1.742 mmoles) of N-bromosuccinimide. The reaction mixture is stirred at room temperature for 2 hrs. and then heated to reflux for 10 min. The reaction mixture is then evaporated to dryness and extracted with 20 ml. of hot i-hexane. The i-hexane extract, after several recrystallizations, yields needles of B-bromodimethylphosphinoborine trimer, M.P. 76–78° C.

EXAMPLE VI

A mixture of 2,5356 g. (11.44 mmoles) of dimethylphosphinoborine trimer and 2.6054 g. (11.58 mmoles) of N-iodosuccinimide in 25 ml. of benzene is stirred for 16 hrs. at room temperature. The solvent is removed in a stream of argon and the light brown residue is triturated twice with 20 ml. portions of water followed by a 20 ml. water wash containing several crystals of sodium thiosulfate, then with water alone and the residue is finally dried. High vacuum fractional sublimation at a bath temperature of 50–75° C., yields B-iododimethylphosphinoborine trimer which is crystallized from 7:3 ethanol-water to provide 2.716 g. of fine white needles, M.P. 80.5–82° C.

In a second experiment, 10.0622 g. (45.4 mmoles) of dimethylphosphinoborine trimer, $[(CH_3)_2PBH_2]_3$, and 11.1833 g. (49.7 mmoles) of N-iodosuccinimide in 70 ml. of benzene are stirred at room temperature for 6 hrs. Sublimation of 40–60° C., after the usual work-up, provides 13.861 g. of $[(CH_3)_2PBH_2]_2(CH_3)_2PBHI$, M.P. 76–78° C. Crystallization from ethanol-water provides 10.7683 g. of material, M.P. 80.5–82° C.

Example VII illustrates the preparation of B-halophosphinoborine linear polymers prepared from the polymers indicated hereinabove by (2).

EXAMPLE VII

A heterogeneous mixture of 1.0053 g. (13.61 mmoles as monomer) of dimethylphosphinoborine linear polymer (degree of polymerization of 40) and 4.3017 g. (32.21 mmoles) of N-chlorosuccinimide in 60 ml. of carbon tetrachloride are heated under reflux for 12 hrs., whereafter an additional 0.5000 g. (3.74 mmoles) of N-chlorosuccinimide is added and the heating continued for another 12 hrs. The solvent is removed in a stream of argon and the solid residue thoroughly washed twice with 25 ml. portions of water followed by two washes with 25 ml. portions of methanol. After thorough drying there is obtained 1.7917 g. (92%) of dimethylphosphinodichloroborine linear polymer, M.P. 237–240° C.

Example VIII illustrates the preparation of B-halo-condensed ring phosphinoborine polymers prepared from the polymers having a ring structure as indicated hereinabove by (4).

EXAMPLE VIII

To a solution of 0.3680 g. (1.041 mmoles) of a condensed-ring phosphinoborine pentamer of structural formula $[(CH_3)_2PBH_2]_4CH_3PBH$, M.P. 96–98° C., in 12 ml. of benzene is added 0.2576 g. (1.145 mmoles) of N-iodosuccinimide. After 4 hrs. of stirring at room temperature in a nitrogen atmosphere, the mixture is allowed to stand overnight. The mixture, now brown in color, is evaporated to dryness in a stream of argon. The resulting viscous oil, after titration with 10 ml. of water containing three crystals of sodium thiosulfate followed by a water wash (10 ml.), affords a light yellow colored solid product, 0.4673 g., M.P. 99–118° C. The crude product is fractionally crystallized and the B-monoiodo-derivatives of the condensed-ring phosphinoborine pentamer are obtained, M.P. 136–137° C. and 147–148.5° C.

Table I sets forth the reactants and the major product obtained in Example IX–XXXIX. The preferred N-halocarbamyl halogenating agents are used throughout these examples.

Table I

| Example | Electropositive halogen Compound | B-hydridophosphinoborine polymer | B-halophosphinoborine polymer |
| --- | --- | --- | --- |
| IX | N-chlorosuccinimide | $[(CH_3)_2PBH_2](CH_3)_2PBH_2$ | $[(CH_3)_2PBH_2]_2(CH_3)_2PBHCl$ |
| X | N-chlorophthalimidine | $CH_3(C_2H_5)PBH_2[CH_3(C_2H_5)PBH_2]_3$ | $CH_3(C_2H_5)PBHCl[CH_3(C_2H_5)PBCl_2]_2$ |
| XI | N-bromo-2-pyrrolidone | $[(CF_3)_2PBH_2]_4$ | $[(CF_3)_2PBBr_2]_4$ |
| XII | N-iodo-2-piperidone | $[(CH_3)_2PBH_2]_3[(CH_3)_2PBH_2]CH_3PBH$ | $[(CH_3)_2PBH_2]_3[(CH_3)_2PBHI]CH_3PBH$ |
| XIII | N-chlorosuccinimide | $[(CH_3)_2PBH_2]_{60}P(CH_3)_3$ | $[(CH_3)_2PBCl_2]_{60}P(CH_3)_3$ |
| XIV | N-iodourea | $[H_2BP(CH_3)(CH_2)_3PBH_2]_x[(CH_3)_2PBH_2]_y$ | $[H_2BP(CH_3)(CH_2)_3(CH_3)PBIH]_x[(CH_3)_2PBHI]_y$ |
| XV | N-chlorosuccinimide | $[(CH_2)_4PBH_2]_3$ | $[(CH_2)_4PBCl_2]_3$ |
| XVI | N,N-dichloroacetamide | $[(C_6H_5)_2PBH_2]_3$ | $[(C_6H_5)_2PBCl_2]_3$ |
| XVII | N-bromodiacetamide | $[(C_{12}H_{25})_2PBH_2]_3$ | $[(C_{12}H_{25})_2PBBr_2]_3$ |
| XVIII | N,N'-dichlorohydantoin | $[(C_6H_{13})_2PBH_2]_3$ | $[(C_6H_{13})_2PBCl_2]_3$ |
| XIX | 1,3-dibromo-5,5-dimethylhydantoin | $[CH_2(CH_2)_5PBH_2]_4$ | $[CH_2(CH_2)_5PBBr_2]_4$ |
| XX | N,N'-dichlorosuccindiamide | $[(C_5H_{11})CH_3PBH_2]_3$ | $[(C_5H_{11})CH_3PBHCl]_3$ |
| XXI | N-bromophthalimide | $[(CH_3)_2PBH_2]_{60}N(CH_3)_3$ | $[(CH_3)_2PBBr_2]_{60}N(CH_3)_3$ |

Table I—Continued

| Example | Electropositive halogen Compound | B-hydridophosphinoborine polymer | B-halophosphinoborine polymer |
|---|---|---|---|
| XXII | N,N'-dibromophtahlyldihydrazine. | $[H_2BP(CH_3)C_6H_4(CH_3)PBH_2]_n$ | $[Br_2BP(CH_3)C_6H_4(CH_3)PBBr_2]_n$ |
| XXIII | N-iodophthalimidine | $[H_2BP(CH_3)(CH_2)_{12}(CH_3)PBH_2]_n$ | $[I_2BP(CH_3)(CH_2)_{12}(CH_3)PBI_2]_n$ |
| XXIV | N-idobiuret | $[H_2BP(CH_3)(CH_2)_8(CH_3)PBH_2]_n$ | $[I_2BP(CH_3)(CH_2)_8(CH_3)PBI_2]_n$ |
| XXV | N-chloro-2-piperidone | $[H_2BP(CH_3)\overset{\frown{(CH_2)_2}}{\underset{\smile{(CH_2)_2}}{CH}}CH(CH_3)PBH_2]_n$ | $[(H)ClBP(CH_3)\overset{\frown{(CH_2)_2}}{\underset{\smile{(CH_2)_2}}{CH}}CH(CH_3)PB(H)Cl]_n$ |
| XXVI | 1-chloro-5,5-dimethylhydantoin. | $[H_2BP(CH_3)\overset{\frown{(CH_2)_2}}{\underset{\smile{(CH_2)_2}}{CH}}CH(CH_3)PB(CH_3)_2]_n$ | $[Cl_2BP(CH_3)\overset{\frown{(CH_2)_2}}{\underset{\smile{(CH_2)_2}}{CH}}CH(CH_3)PB(CH_3)_2]_n$ |
| XXVII | N-chloro-1,2-cyclohexanedicarboximide. | $[H_2BP(CH_3)(CH_2)_4(CH_3)PBH_2]_n$ | $[ClHBP(CH_3)(CH_2)_4(CH_3)PBH_2]_n$ |
| XXVIII | N-bromourea | $[(CH_3)_2PBH_2]_{50}PH(CH_3)_2$ | $[(CH_3)_2PBBr_2]_{50}PH(CH_3)_2$ |
| XXIX | N-iodo-2-oxo-hexamethylenimine. | $[(CH_3)_2PBH_2]_{40}NH(CH_2)_2$ | $[(CH_3)_2PBI_2]_{40}NH(CH_2)_2$ |
| XXX | N-chloro-N-acetylacryloylimide. | $[(CH_3)_2PBH_2]_{60}P(CH_3)$ | $[(CH_3)_2PBHCl]_{60}P(CH_3)_3$ |
| XXXI | N,N-dibromoacetamide | $[(CH_3)_2PBH_2]_2(CH_3)_2PBH_2$ | $[(CH_3)_2PBH_2]_2(CH_3)_2PBBrH$ |
| XXXII | N-chloro-2-naphthamide | $[(CH_3)_2PBH_2]_5[CH_3PBH]_2$ | $[(CH_3)_2PBCl_2]_5[CH_2PBH]_2$ |
| XXXIII | N-iodoformamide | $[(CH_3)_2PBH_2]_4[CH_3PBH]$ | $[(CH_3)_2PBI_2]_4[CH_3PBI]$ |
| XXXIV | N,N'-dibromohydantoin | $[(CH_3)_2PBH_2]_3$ | $[(CH_3)_2PBHBr]_3$ |
| XXXV | N-bromomoleamide | $[(C_2H_5)_2PBH_2]_4$ | $[(C_2H_5)_2PBBr_2]_4$ |
| XXXVI | N,N'-dichlorophthalamide | $[(C_4H_9)_2PBH_2]_3$ | $[(C_4H_9)_2PBCl_2]_3$ |
| XXXVII | N,N'-dibromo-N,N'-methylene-bisacetamide. | $[(CH_3)_2BP(CH_3)(CH_2)_6(CH_3)PBH_2]_n$ | $[(CH_3)_2BP(CH_3)(CH_2)_6(CH_3)PBBr_2]_n$ |
| XXXVIII | N,N'-dichloroadipamide | $[(CH_3)_2BP(CH_3)(CH_2)_5(CH_3)PBH_2]_n$ | $[(CH_3)_2BP(CH_3)(CH_2)_5(CH_3)PBCl_2]_n$ |
| XXXIX | N,N'-dibromo-1,4-diacetamido-naphthalene. | $[(C_8H_{17})_2PBH_2]_3$ | $[(C_8H_{17})_2PBBr_2]_3$ |

EXAMPLE XL

A solution of 0.1562 g. (0.528 mmole) of dimethylphosphinoborine tetramer, $[(CH_3)_2PBH_2]_4$, and 0.0771 g. (0.270 mmole) of 1,3-dibromo-5,5-dimethyl-hydantoin in 10 ml. of benzene is stirred at ambient temperature for 2 hrs., then heated under reflux for 1 hr. The mixture is cooled in ice and the resulting white solid filtered to give 0.0327 g. (0.255 mmole; 94.5%) of 5,5-dimethylhydantoin, M.P. 167.5–169.5° C. The filtrate is evaporated to dryness and yields 0.1996 g. of crude B-monobromo-dimethylphosphinoborine tetramer, M.P. 156–173° C. Sublimation in high vacuum at 100–125° C. provides 0.1815 g. of product, M.P. 156–167° C., which is found to contain 91.0% of B-monobromo-dimethylphosphinoborine tetramer by vapor phase chromatography and infrared analysis.

EXAMPLE XLI

Employing the procedure as described in Example VIII, two isomeric monobromo-derivatives of $$[(CH_3)_2PBH_2]_4CH_3PBH$$

are prepared from 0.2390 g. (0.676 mmole) of the condensed ring $[(CH_3)_2PBH_2]_4CH_3PBH$ and 0.1250 g. (0.702 mmole) of N-bromosuccinimide in 5 ml. of benzene. Resolution and purification of the crude mixture, 0.2831 g., M.P. 97–120° C., by fractional crystallization provides 0.1034 g. (0.239 mmole, 35.4% yield) of a B-monobromo-derivative of the condensed-ring phosphinoborine pentamer, M.P. 143–144° C. and 0.0470 g. (0.109 mmole, 16.1% yield) of a B-monobromo-derivative, M.P. 123.5–125.0° C.

EXAMPLE XLII

Utilizing the same procedure as in Example VI but varying the ratio of reactants, 1.5048 g. (6.79 mmoles) of dimethylphosphinoborine trimer to 3.2080 g. (14.26 mmoles) of N-iodosuccinimide in 60 ml. of benzene, there is obtained a B,B'-diiodo-derivative of the dimethylphosphinoborine trimer, M.P. 118.5–119.5°, after crystallization of the crude product from ethanol.

Table II sets forth the reactants and the major product obtained in Examples XLIII–LVII. Various electropositive halogenating agents are used in these examples.

Table II

| Example | Electropositive halogen Compound | B-hydridophosphinoborine polymer | B-halophosphinoborine polymer |
|---|---|---|---|
| XLIII | Ethyl α-bromomalonate | $[(CH_3)_2PBH_2]_3$ | $[(CH_3)_2PBHBr]_2(CH_3)_2PBH_2$ |
| XLIV | Chloropicrin | $[(CH_3)_2PBH_2]_3$ | $[(CH_3)_2PBH_2]_2(CH_3)_2PBHCL$ |
| XLV | α-Bromobenzyl cyanide | $[(CH_3)_2PBH_2]_{60}N(CH_3)_3$ | $[(CH_3)_2PBBr_2]_{60}N(CH_3)_3$ |
| XLVI | p-Phenylphenacyl chloride | $[(CH_3)_2PBH_2]_{60}P(CH_3)_3$ | $[(CH_3)_2PBCl_2]_{60}P(CH_3)_3$ |
| XLVII | Chloroacetone | $[(CH_3)_2PBH_2]_{60}P(CH_3)_3$ | $[(CH_3)_2PBHCl]_{60}P(CH_3)_3$ |
| XLVIII | 1-chloro-1-nitropropane | $CH_3(C_2H_5)PBH_2[CH_3(C_2H_5)PBH_2]_2$ | $CH_3(C_2H_5)PBHCl[CH_3(C_2H_5)PBCl_2]_2$ |
| XLIX | N-bromo-t-butylamine | $[(CH_3)_2PBH_2]_{50}PH(CH_3)_2$ | $[(CH_3)_2PBBr_2]_{50}PH(CH_3)_2$ |
| L | ω-Tribromoquinaldine | $[(CH_3)_2PBH_2]_3$ | $[(CH_3)_2PBHBr]_3$ |
| LI | N,2,4-trichlorobenazilide | 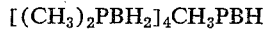$[(CH_2)_4PBH_2]_3$ | $[(CH_2)_4PBCl_2]_3$ |
| LII | Bromine monochloride | $[H_2BP(CH_3)C_6H_4(CH_3)PBH_2]_n$ | $[Br_2BP(CH_3)C_6H_4(CH_3)PBBr_2]_n$ |
| LIII | N,2,4,6-tetrachlorobenzanilide | $[(CH_3)_2PBH_2]_{60}P(CH_3)_3$ | $[(CH_3)_2PBHCl]_{60}P(CH_3)_3$ |
| LIV | Bis-N,2,4,6-tetrachlorocarbanilide. | $[(CH_3)_2PBH_2]_3$ | $[(CH_3)_2PBH_2]_2(CH_3)_2PBHCl$ |
| LV | N-chloroacetamide | $CH_3(C_2H_5)PBH_2[CH_3(C_2H_5)PBH_2]_2$ | $CH_3(C_2H_5)PBHCl[CH_3(C_2H_5)PBCl_2]_2$ |
| LVI | Ethyl bromoacetate | $[(CH_3)_2PBH_2]_6 N(CH_3)_3$ | $[(CH_3)_2PBBr_2]_{60}N(CH_3)_3$ |
| LVII | Ethyl dichloroacetate | $[(CH_3)_2PBH_2]_2(CH_3)_2PBH_2$ | $[(CH_3)_2PBH_2]_2(CH_3)_2PBHCl$ |
| LVII (a) | N,N-dichlorobenzenesulfonamide. | $[(CH_3)_2PBH_2]_3$ | $[(CH_3)_2PBCl_2]_3$ |
| LVII (b) | 1-bromo-5,5-dimethyl-2,4-dithiohydantoin. | $[(CH_3)(C_6H_5)PBH_2]_3$ | $[(CH_3)(C_6H_5)PBHBr]_3$ |
| LVII (c) | N-chlorothioacetamide | $[(CH_3)_2PBH_2]_5 N(C_2H_5)_3$ | $[(CH_3)_2PBCl_2]_{50}N(C_2H_5)_3$ |
| LVII (d) | N-chlorothiourea | $[(cyclo-C_6H_{11})_2PBH_2]_3$ | $[(cyclo-C_6H_{11})_2PBHCl]_3$ |
| LVII (e) | N-bromoguanidine | $[(CH_3)_2PBH_2]_4$ | $[(CH_3)_2PBH_2]_3(CH_3)_2PBHBr$ |

EXAMPLE LVIII

In a 5 ml. heavy-wall nitrogen-filled tube is placed 0.1952 g. (0.881 mmole) of dimethylphosphinoborine trimer and 0.1867 g. (0.896 mmole) of phosphorus pentachloride. A seal-off tube is attached. The tube is evacuated and 1.0 ml. of dry pyridine is introduced in vacuo. The sealed tube is then heated at 75° C. for 2 hrs. and opened in vacuo. After removal of the pyridine in vacuo the yellow, semi-solid residue is washed from the tube with water, collected and dried to give a pure white powder. The 0.1712 g. of product on sublimation in high vacuum at a bath temperature of 25–90° C. provides 0.1643 g. of a brittle white solid which is found to contain 68.6% B-monochlorodimethylphosphinoborine trimer by vapor phase chromatography.

As illustrated in the foregoing examples, the process of the present invention can be carried out at a temperature within the range of about 0° C. and 200° C. and preferably at a temperature within the range of 2° C. to 100° C. However, the temperature is not critical in this invention, it being only necessary to avoid elevating the temperature to the point where the reactants or the products decompose, or reducing the temperature so low that the rate of reaction is too slow for practical purposes.

The reaction is preferably carried out in the presence of a solvent. Under certain circumstances, hydrocarbon solvents such as benzene or petroleum ether may be used. In addition to these, other preferred solvents include: aliphatic ethers such as diamyl ether, diheptyl ether, isobutyl neopentyl ether, disopropyl ether, dimethyl ether, diethyl ether, ethylene glycol dimethylether, ethylene glycol diethylether, ethylene glycol dipropylether, ethylene glycol dibutylether, diethylene glycol dimethylether, diethylene glycol diethylether, diethylene glycol dipropylether, diethylene glycol dibutylether, triethylene glycol dimethylether, triethylene glycol diethylether, triethylene glycol dipropylether, triethylene glycol dibutylether, tetraethylene glycol dimethylether, tetraethylene glycol diethylether, dipropyl ether, butyl ethyl ether, hexyl methyl ether; arene ethers such as anisole, phenetole, diphenyl ether, veratrole, benzyl phenyl ether, dinaphthyl ether; cyclic ethers, such as tetrahydrofran, dioxane, tetrahydropyran; arene or aliphatic hydrocarbons such as diisoamyl, hexane, n-hexadecane, cyclohexane, iso-octane, cyclopentane, trimethylpentane, 2-methylpentane, isopentane, methylcyclohexane, benzene, octadeacyclohexane, naphthalene, toluene, p-xylene, naphtha, butylbenzene, ethylbenzene, cumene, octadecylbenzene; etc.; halogenated solvents, such as carbon tetrachloride, chloroform, methylene chloride, methyl chloride, 1-chloro-4-fluorobenzene, 1-chlorohexane, 1-chloro-2-iodoethane, 2-chloro-2-methylbutane, cloroethane, 1-chlorodecane, fluorobenzene, bromoethane, 1-bromo-4-fluorobenzene, bromoform, methylene bromide, methyl bromide, methyl iodide, ethyl iodide, and 1-bromonaphthalene and the like.

Mixtures of solvents can be employed if desired. The aliphatic ether solvents are particularly useful because they are good solvents for the reactants and product, they are inexpensive, readily available and when the product is left in solution they provide an excellent reaction medium for further reactions.

The B-hydridophosphinoborine polymers used according to this invention include, for example, the following:

$[(CF_3)_2PBH_2]_3$
$[(C_2H_5)_2PBH_2]_3$
$[CH_2(CH_2)_3PBH_2]_3$

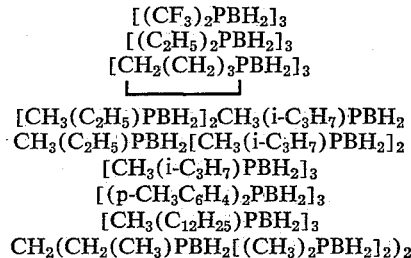

$[CH_3(C_2H_5)PBH_2]_2CH_3(i\text{-}C_3H_7)PBH_2$
$CH_3(C_2H_5)PBH_2[CH_3(i\text{-}C_3H_7)PBH_2]_2$
$[CH_3(i\text{-}C_3H_7)PBH_2]_3$
$[(p\text{-}CH_3C_6H_4)_2PBH_2]_3$
$[CH_3(C_{12}H_{25})PBH_2]_3$
$CH_2(CH_2(CH_3)PBH_2[(CH_3)_2PBH_2]_2)_2$

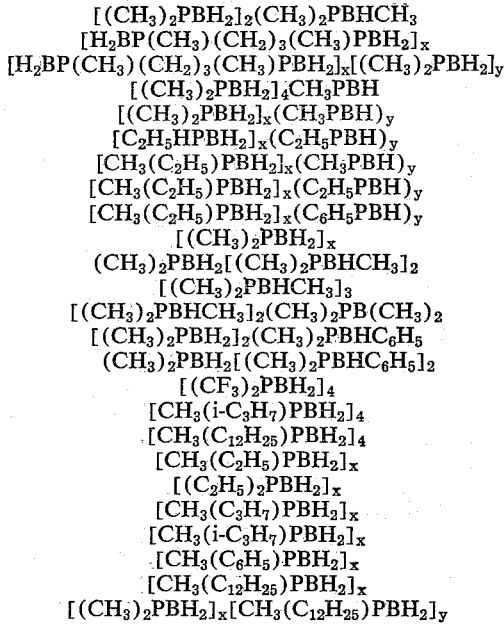

$[(CH_3)_2PBH_2]_2(CH_3)_2PBHCH_3$
$[H_2BP(CH_3)(CH_2)_3(CH_3)PBH_2]_x$
$[H_2BP(CH_3)(CH_2)_3(CH_3)PBH_2]_x[(CH_3)_2PBH_2]_y$
$[(CH_3)_2PBH_2]_4CH_3PBH$
$[(CH_3)_2PBH_2]_x(CH_3PBH)_y$
$[C_2H_5HPBH_2]_x(C_2H_5PBH)_y$
$[CH_3(C_2H_5)PBH_2]_x(CH_3PBH)_y$
$[CH_3(C_2H_5)PBH_2]_x(C_2H_5PBH)_y$
$[CH_3(C_2H_5)PBH_2]_x(C_6H_5PBH)_y$
$[(CH_3)_2PBH_2]_x$
$(CH_3)_2PBH_2[(CH_3)_2PBHCH_3]_2$
$[(CH_3)_2PBHCH_3]_3$
$[(CH_3)_2PBHCH_3]_2(CH_3)_2PB(CH_3)_2$
$[(CH_3)_2PBH_2]_2(CH_3)_2PBHC_6H_5$
$(CH_3)_2PBH_2[(CH_3)_2PBHC_6H_5]_2$
$[(CF_3)_2PBH_2]_4$
$[CH_3(i\text{-}C_3H_7)PBH_2]_4$
$[CH_3(C_{12}H_{25})PBH_2]_4$
$[CH_3(C_2H_5)PBH_2]_x$
$[(C_2H_5)_2PBH_2]_x$
$[CH_3(C_3H_7)PBH_2]_x$
$[CH_3(i\text{-}C_3H_7)PBH_2]_x$
$[CH_3(C_6H_5)PBH_2]_x$
$[CH_3(C_{12}H_{25})PBH_2]_x$
$[(CH_3)_2PBH_2]_x[CH_3(C_{12}H_{25})PBH_2]_y$ Specific examples of B-halophosphinoborine polymers which can be produced according to this invention include the following:

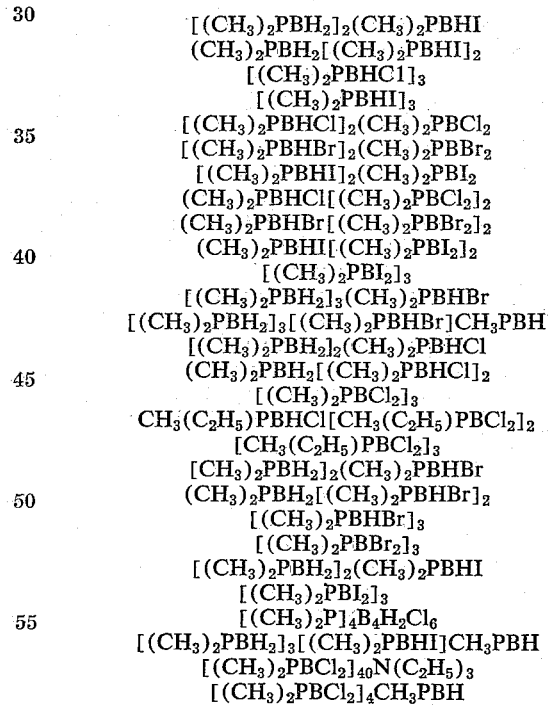

$[(CH_3)_2PBH_2]_2(CH_3)_2PBHI$
$(CH_3)_2PBH_2[(CH_3)_2PBHI]_2$
$[(CH_3)_2PBHCl]_3$
$[(CH_3)_2PBHI]_3$
$[(CH_3)_2PBHCl]_2(CH_3)_2PBCl_2$
$[(CH_3)_2PBHBr]_2(CH_3)_2PBBr_2$
$[(CH_3)_2PBHI]_2(CH_3)_2PBI_2$
$(CH_3)_2PBHCl[(CH_3)_2PBCl_2]_2$
$(CH_3)_2PBHBr[(CH_3)_2PBBr_2]_2$
$(CH_3)_2PBHI[(CH_3)_2PBI_2]_2$
$[(CH_3)_2PBI_2]_3$
$[(CH_3)_2PBH_2]_3(CH_3)_2PBHBr$
$[(CH_3)_2PBH_2]_3[(CH_3)_2PBHBr]CH_3PBH$
$[(CH_3)_2PBH_2]_2(CH_3)_2PBHCl$
$(CH_3)_2PBH_2[(CH_3)_2PBHCl]_2$
$[(CH_3)_2PBCl_2]_3$
$CH_3(C_2H_5)PBHCl[CH_3(C_2H_5)PBCl_2]_2$
$[CH_3(C_2H_5)PBCl_2]_3$
$[CH_3)_2PBH_2]_2(CH_3)_2PBHBr$
$(CH_3)_2PBH_2[(CH_3)_2PBHBr]_2$
$[(CH_3)_2PBHBr]_3$
$[(CH_3)_2PBBr_2]_3$
$[(CH_3)_2PBH_2]_2(CH_3)_2PBHI$
$[(CH_3)_2PBI_2]_3$
$[(CH_3)_2P]_4B_4H_2Cl_6$
$[(CH_3)_2PBH_2]_3[(CH_3)_2PBHI]CH_3PBH$
$[(CH_3)_2PBCl_2]_4ON(C_2H_5)_3$
$[(CH_3)_2PBCl_2]_4CH_3PBH$

The substituents, $R_1$, $R_2$, $R_3$, $R_4$, $R_5$, and $R_6$, as defined above, can be monovalent alicyclic, acyclic or arene substituents. Typical examples of these monovalent substituents include: aryl substituents such as phenyl, biphenylyl, naphthyl, and indanyl; alkaryl substituents such as cumenyl, tolyl, xylyl, mesityl, benzyl, phenethyl, diphenylmethyl, α-methylbenzyl, trityl, 2-methylbenzyl and 3-phenylpropyl; alkyl substituents such as methyl, ethyl, propyl, butyl, amyl, neopentyl, decyl, hexyl, 2-methylpentyl, 5-methylhexyl, dodecyl and iso-octyl; and cycloalkyl substituents such as cyclohexyl, cyclopentyl, cycloheptyl, cyclohexenyl, 4-methylcyclohexyl, 2,4,6-trimethylcyclohexyl and 3-isopropylcyclopentyl. Preferred substituents include the aryl substituent, phenyl; the alkaryl substituents, lower alkyl substituted phenyl; the lower alkyl substituents having from 1 to 12 carbon atoms; and the cycloalkyl substituents having 5 or 6 annular carbon atoms. These substituents have been found to produce the most desirable results. The most preferred substituents are the lower alkyl radicals having from 1 to 12 carbon atoms and the phenyl radical because the reactions proceed easily in their presence and the products are particularly useful and stable.

The bivalent substituents, $R_3$ and $R_4$, when taken together, and R, as defined above, can be any of the bivalent arene, alicyclic or acyclic substituents. Typical examples of these bivalent substituents include: arylene substituents such as phenylene, naphthylene, acenaphthylene, and biphenylene; alkarylene substituents such as durylene, benzylidene, xylylene and tolylene; alkylene substituents such as methylene, ethylene, hexamethylene, neopentylene, isobutylene, ethylidene, propylene and tetramethylene; and cycloalkylene substituents such as cyclohexadienylene, cyclohexylene, cyclopentylene, cyclohexdienylidene and cyclohexenylene. Preferred substituents include the aryl substituent phenylene; the alkarylene substituents which are lower alkyl substituted phenylene; the lower alkylene substituents having from 1 to 12 carbon atoms; and the cycloalkylene substituents having 5 or 6 annular carbon atoms. These substituents have been found to produce the best results. The most preferred substituents are the lower alkylene substituents having from 4 to 12 carbon atoms.

Particularly useful electropositive halogen compounds include, for example, the following: N-chloroacetanilide, N:2:4:6 - tetrachloroacetanilide, N - bromophenylacetamide, phosphorus pentachloride (conveniently prepared from the reaction of chlorine and phosphorous trichloride), iodine monobromide, iodine monochloride, iodine trichloride, bromine trichloride, iodine cyanide, iodine cyanate, iodine thiocyanate, N,N-dichlorobenzenesulfonamide, N-bromoacetamide, N-bromosuccinimide, N,N-dibromobenzenesulfonamide, 1,3-dibromo-5,5 - dimethylhydantoin, 1,3-dibromo - 5 - methyl-5 - ethylhydantoin, 1-bromo - 5,5-dimethylhydantoin, 1-bromo-5-methyl-5-isopropylhydantoin, 1-bromo-5-methyl-5 - isobutylhydantoin, and N-chloroguanidine.

The following specific compounds exemplify the general structure of the halogenated polymers provided by this invention:

A typical B-halophosphinoborine polymer which is characteristic of the structure of the polymers which are prepared from those polymer shaving the general Formula 1 $[R_4R_3PBR_1R_2]_n$ is the trimeric B-bromo-P-dimethylphosphinoborine when $n$ equals 3 having the structural formula:

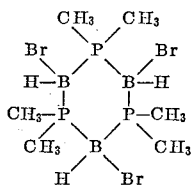

A typical B-halophosphinoborine polymer which is characteristic of the structure of the polymers which are prepared from those polymers having the general Formula 2 $[R_4R_3PBR_1R_2]_nA$ is the linear polymer B-iodo-P-dimethylphosphinoborine having a degree of polymerization of 3, terminated with an acidic borine group on one end and a basic secondary phosphine on the other end, and having the structural formula:

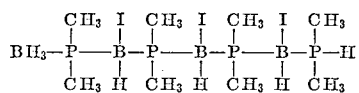

A typical B-halophosphinoborine polymer which is characteristic of the structure of the polymers which are prepared from those polymers having the general Formula 3 $[R_2R_1BP(R_3)R(R_3)PBR_1R_2]_n$ is the separate ring polymer having the formula:

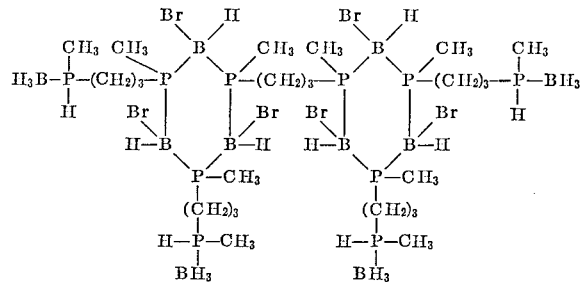

A typical B-halophosphinoborine polymer which is characteristic of the structure of the polymers which are prepared from those polymers having the general Formula 4 $[R_4R_3PBR_1R_2]_m[R_3PBR_1]_z$ is the fused ring polymer having the formula:

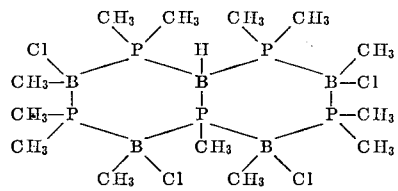

The polymer which has the general Formula 3 is terminated, as indicated above in the specific structural formula, with acidic groups. The number of acidic groups varies with the specific structure of the polymer and can range from 4 to about $n+2$. The acidic terminating groups on polymer (3) can be any of those defined above with reference to Formula 1. These groups are acidic by the Lewis acid concept of acidity.

The terminating group, —A, in polymer (2) is basic in nature. Substantially any group, organic or inorganic, which is basic enough to attach to the acidic boron group, which is at the end of the polymer chain, will terminate the chain. Convenient terminating groups include the secondary and tertiary phosphines and amines which can be represented by the general formula —D$(R_3)_3$, where D is either phosphorous or nitrogen and only one $R_3$ in any one group is hydrogen. The nature of the terminating basic groups is not critical in this invention since it does not enter into the reaction in any way and is present only because any linear polymer must be terminated in order to prevent cyclization.

The ratio of $m$ to $z$ in polymer (4), above, determines the extent to which the rings in the polymer are fused together. The larger $z$ is with respect to $m$ the greater the number of ring fusions in the polymer. Thus, if the ratio of $m$ to $z$ is 1:1 or less the rings are highly fused while if the ratio is 6:1 or greater generally the rings are larger and contain more annular phosphinoborine groups with few ring fusions. The ratio of $m$ to $z$ can be as low as about 0.1 to 1 and as high as about 6 to 1. Preferably the ratio of $m$ to $z$ is between about 0.5 to 1 and 4 to 1 since they are easier to produce and have very desirable physical properties. Polymers which have a ratio close to 0.5 to 1 are highly cross-linked solids while those having a ratio close to 4 to 1 are generally viscous liquids.

The integer $n$ which is indicative of the degree of polymerization of polymers (1) through (2) can range from 2 for the simple linear polymers and 3 for the simple cyclic polymers through 3,000 and even higher.

As will be understood by those skilled in the art, what has been described is the preferred embodiment of the invention; however, many modifications, changes and substitutions can be made therein without departing from the scope and the spirit of the following claims:

We claim:
1. Process for the production of a B-halophosphinoborine polymer comprising:
   (a) admixing and
   (b) reacting
      (I) a B-hydridophosphinoborine polymer; with
      (II) an electropositive halogen compound comprising an N-halocarbamoyl compound selected from the group consisting of:

(1) 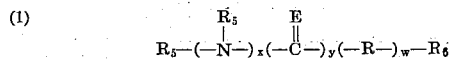

(2) 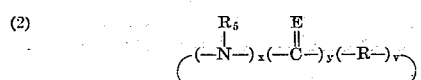

and mixtures thereof, wherein,

E is selected from the group consisting of oxygen, sulfur and imino nitrogen;
$R_5$ is selected from the group consisting of monovalent chlorine, bromine, iodine, hydrogen, lower alkyl, phenyl, lower alkyl substituted phenyl, and cycloalkyl substituents having from 5 to 6 annular carbon atoms; at least one $R_5$ substituent in each of said (1) and (2) being halogen;
$R_6$ is selected from the group consisting of monovalent hydrogen, lower alkyl, phenyl, lower alkyl substituted phenyl, and cycloalkyl substituents having from 5 to 6 annular carbon atoms;
R is selected from the group consisting of lower alkylene, phenylene, lower alkyl substituted phenylene and cycloalkylene substituents containing from 5 to 6 annular carbon atoms;
$x$ and $y$ are integers, their ratio being between 1:2 and 2:1;
$w$ and $v$ are integers, $w$ ranging from 0 to $(x+y-2)$ and $v$ ranging from 1 to $(x+y-1)$;
the substituents

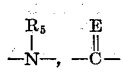

and (—R—) being arranged in any order with at least one

substituent being positioned adjacent to at least one

substituent; and
   (c) recovering said B-halophosphinoborine polymer.

2. The process of claim 1 wherein said B-hydridophosphinoborine polymer is dimethylphosphinoborine trimer and said electropositive halogen compound is N-chlorosuccinimide.

3. The process of claim 1 wherein said B-hydridophosphinoborine polymer is dimethylphosphinoborine trimer and said electropositive halogen compound is N-bromosuccinimide.

4. The process of claim 1 wherein said B-hydridophosphinoborine polymer is a dimethylphosphinoborine linear polymer having a degree of polymerization of 40 and said electropositive halogen compound is N-chlorosuccinimide.

5. The process of claim 1 wherein said B-hydridophosphinoborine polymer is a condensed-ring phosphinoborine pentamer having the structural formula

and said electropositive halogen compound is N-iodosuccinimide.

6. Process for the production of a B-halophosphinoborine polymer comprising:
   (a) admixing and
   (b) reacting
      (I) a B-hydridophosphinoborine polymer selected from the group consisting of:
         (1) $[R_4R_3PER_1R_2]_n$,
         (2) $[R_4R_3PER_1R_2]_nA$,
         (3) $[R_2R_1BP(R_3)R(R_3)PBR_1R_2]_n$
         (4) $[R_4R_3PBR_1R_2]_m[R_3PBR_1]_z$,
      mixtures and copolymers thereof, wherein,
$R_1$ and $R_2$ are each independently selected for each monomeric unit from the group consisting of monovalent hydrogen, lower alkyl, phenyl, lower alkyl substituted phenyl, and cycloalkyl substituents having from 5 to 6 annular carbon atoms; at least one of said $R_1$ and $R_2$ being hydrogen in each of said polymers (1), (2), (3), and (4);
$R_3$ and $R_4$ are selected for each monomeric unit from the group consisting of two independently selected monovalent, lower alkyl, phenyl, lower alkyl substituted phenyl, and cycloalkyl substituents having from 5 to 6 annular carbon atoms, and taken together, one single bivalent lower alkylene, phenylene, lower alkyl substituted phenylene, and cycloalkylene substituents containing from 5 to 6 annular carbon atoms;
R is selected from the group consisting of bivalent lower alkylene, phenylene, lower alkyl substituted phenylene, and cycloalkylene substituents containing from 5 to 6 annular carbon atoms;
$n$ is an integer ranging from 2 to 3,000 and is indicative of the degree of polymerization of said polymers;
$m$ and $z$ are integers the ratio of which ranges from about 0.1 to 1 to about 6 to 1, and is indicative of the degree of ring fusion of said polymer (4);
A is a basic terminating group having the formula —D($R_3$)$_3$, wherein D is selected from the group consisting of phosphorous and nitrogen; with
      (II) an electropositive halogen compound comprising an N-halocarbamoyl compound selected from the group consisting of:

(1) 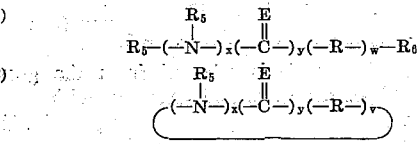

(2) 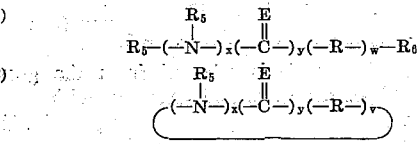

and mixtures thereof, wherein,
E is selected from the group consisting of oxygen, sulfur and imino nitrogen;
$R_5$ is selected from the group consisting of monovalent chlorine, bromine, iodine, hydrogen phenyl, lower alkyl substituted phenyl, lower alkyl and cycloalkyl substituents having from 5 to 6 annular carbon atoms; at least one $R_5$ substituted in each of said (1) and (2) being halogen;
$R_6$ is selected from the group consisting of monovalent hydrogen phenyl, lower alkyl substituted phenyl, lower alkyl and cycloalkyl substituents having from 5 to 6 annular carbon atoms;
R is as defined above;
$x$ and $y$ are integers, their ratio being between 1:2 and 2:1;
$w$ and $v$ are integers, $w$ ranging from 0 to $(x+y-2)$ and $v$ ranging from 1 to $(x+y-1)$;
the substituents

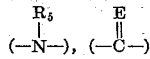

and (—R—) being arranged in any order with at least one

substituent being positioned adjacent to at least one

substituent;

(c) and recovering said B-halophosphinoborine polymer.

7. Process for the production of a B-chlorophosphinoborine polymer comprising:
(a) admixing and
(b) reacting
(I) A B-hydridophosphinoborine polymer selected from the group consisting of:
(1) $[R_4R_3PBR_1R_2]_n$,
(2) $[R_4R_3PBR_1R_2]_nA$,
(3) $[R_2R_1BP(R_3)R(R_3)PBR_1R_2]_n$,
(4) $[R_4R_3PBR_1R_2]_m[R_3PBR_1]_z$,
mixtures and copolymers thereof, wherein, $R_1$ and $R_2$ are each independently selected for each monomeric unit from the group consisting of monovalent hydrogen, lower alkyl, phenyl, lower alkyl substituted phenyl, and cycloalkyl substituents having from 5 to 6 annular carbon atoms; at least one of said $R_1$ and $R_2$ being hydrogen in each of said polymers (1), (2), (3) and (4);

$R_3$ and $R_4$ are selected for each monomeric unit from the group consisting of two independently selected monovalent, lower alkyl, phenyl, lower alkyl substituted phenyl, and cycloalkyl substituents having from 5 to 6 annular carbon atoms, and taken together, one single bivalent lower alkylene, phenylene, lower alkyl substituted phenylene, and cycloalkylene substituents containing from 5 to 6 annular carbon atoms;

R is selected from the group consisting of bivalent lower alkylene, phenylene, lower alkyl substituted phenylene, and cycloalkylene substituents containing from 5 to 6 annular carbon atoms;

$n$ is an integer ranging from 2 to 3,000 and is indicative of the degree of polymerization of said polymers;

$m$ and $z$ are integers the ratio of which ranges from about 0.1 to 1 to about 6 to 1, and is indicative of the degree of ring fusion in said polymer (4);

A is a basic terminating group having the formula —$D(R_3)_3$, wherein D is selected from the group consisting of phosphorous and nitrogen; with
(II) the electropositive chlorine compound N,N-dichlorobenzenesulfonamide; and (c) recovering said B-chlorophosphinoborine polymer.

8. Process for the production of a B-chlorophosphinoborine polymer comprising:
(a) admixing and
(b) reacting
(I) a B-hydridophosphinoborine polymer selected from the group consisting of:
(1) $[R_4R_3PBR_1R_2]_n$,
(2) $[R_4R_3PBR_1R_2]_nA$,
(3) $[R_2R_1BP(R_3)R(R_3)PBR_1R_2]_n$,
(4) $[R_4R_3PBR_1R_2]_m[R_3PBR_1]_z$,
mixtures and copolymers thereof, wherein, $R_1$ and $R_2$ are each independently selected for each monomeric unit from the group consisting of monovalent hydrogen, lower alkyl, phenyl, lower alkyl substituted phenyl, and cycloalkyl substituents having from 5 to 6 annular carbon atoms; at least one of said $R_1$ and $R_2$ being hydrogen in each of said polymers (1), (2), (3) and (4);

$R_3$ and $R_4$ are selected for each monomeric unit from the group consisting of two independently selected monovalent, lower alkyl, phenyl, lower alkyl substituted phenyl, and cycloalkyl substituents having from 5 to 6 annular carbon atoms; and taken together, one single bivalent lower alkylene, phenylene, lower alkyl substituted phenylene, and cycloalkylene substituents containing from 5 to 6 annular carbon atoms;

R is selected from the group consisting of bivalent lower alkylene, phenylene, lower alkyl substituted phenylene, and cycloalkylene substituents containing from 5 to 6 annular carbon atoms;

$n$ is an integer ranging from 2 to 3,000 and is indicative of the degree of polymerization of said polymers;

$m$ and $z$ are integers the ratio of which ranges from about 0.1 to 1 to about 6 to 1, and is indicative of the degree of ring fusion in said polymer (4);

A is a basic terminating group having the formula —$D(R_3)_3$, wherein D is selected from the group consisting of phosphorous and nitrogen; with
(II) the electropositive chlorine compound N-chloro-acetamide; and (c) recovering said B-chlorophosphinoborine polymer.

9. Process for the production of a B-bromophosphinoborine polymer comprising:
(a) admixing and
(b) reacting
(I) a B-hydrophosphinoborine polymer selected from the group consisting of:
(1) $[R_4R_3PBR_1R_2]_n$,
(2) $[R_4R_3PBR_1]_nA$,
(3) $[R_2R_1BP(R_3)R(R_3)PBR_1R_2]_n$,
(4) $[R_4R_3PBR_1R_2]_m[R_3PBR_1]_z$,
mixtures and copolymers thereof, wherein, $R_1$ and $R_2$ are each independently selected for each monomeric unit from the group consisting of monovalent hydrogen, lower alkyl, phenyl, lower alkyl substituted phenyl, and cycloalkyl substituents having from 5 to 6 annular carbon atoms; at least one of said $R_1$ and $R_2$ being hydrogen in each of said polymers (1), (2), (3) and (4);

$R_3$ and $R_4$ are selected for each monomeric unit from the group consisting of two independently selected monovalent, lower alkyl, phenyl, lower alkyl substituted phenyl, and cycloalkyl substituents having from 5 to 6 annular carbon atoms, and taken together, one single bivalent lower alkylene, phenylene, lower alkyl substituted phenylene, and cycloalkylene substituents containing from 5 to 6 annular carbon atoms;

R is selected from the group consisting of bivalent lower alkylene, phenylene, lower alkyl substituted phenylene, and cycloalkylene substituents containing from 5 to 6 annular carbon atoms;

$n$ is an integer ranging from 2 to 3,000 and is indicative of the degree of polymerization of said polymers;

$m$ and $z$ are integers the ratio of which ranges from about 0.1 to 1 to about 6 to 1, and is indicative of the degree of ring fusion in said polymer (4);

A is a basic terminating group having the formula —$D(R_3)_3$, wherein D is selected from the group consisting of phosphorous and nitrogen; with
(II) the electropositive bromine compound N-bromosuccinimide; and (c) recovering said B-bromophosphinoborine polymer.

10. Process for the production of a B-chlorophosphinoborine polymer comprising:
(a) admixing and
(b) reacting
(I) a B-hydridophosphinoborine polymer selected from the group consisting of:
(1) $[R_4R_3PBR_1R_2]_n$,
(2) $[R_4R_3PBR_1R_2]_nA$,
(3) $[R_2R_1BP(R_3)R(R_3)PBR_1R_2]_n$,
(4) $[R_4R_3PBR_1R_2]_m[R_3PBR_1]_z$, mixtures and copolymers thereof, wherein, $R_1$ and $R_2$ are each independently selected for each monomeric unit from the group consisting of monovalent hydrogen, lower alkyl, phenyl, lower alkyl substituted phenyl, and cycloalkyl substituents having from 5 to 6 annular carbon atoms; at least one of said $R_1$ and $R_2$ being hydrogen in each of said polymers (1), (2), (3) and (4);

$R_3$ and $R_4$ are selected for each monomeric unit from the group consisting of two independently selected monovalent, lower alkyl, phenyl, lower alkyl substituted phenyl, and cycloalkyl substituents having from 5 to 6 annular carbon atoms, and taken together, one single bivalent lower alkylene, phenylene, lower alkyl substituted phenylene, and cycloalkylene substituents containing from 5 to 6 annular carbon atoms;

R is selected from the group consisting of bivalent lower alkylene, phenylene, lower alkyl substituted phenylene, and cycloalkylene substituents containing from 5 to 6 annular carbon atoms;

$n$ is an integer ranging from 2 to 3,000 and is indicative of the degree of polymerization of said polymers;

$m$ and $z$ are integers the ratio of which ranges from about 0.1 to 1 to about 6 to 1, and is indicative of the degree of ring fusion in said polymer (4);

A is a basic terminating group having the formula —$D(R_3)_3$, wherein D is selected from the group consisting of phosphorous and nitrogen; with (II) the electropositive chlorine compound N-chlorosuccinimide; and (c) recovering said B-chlorophosphinoborine polymer.

11. Process for the production of a B-iodophosphinoborine polymer comprising:
(a) admixing and
(b) reacting
(I) a B-hydridophosphinoborine polymer selected from the group consisting of:
(1) $[R_4R_3PBR_1R_2]_n$,
(2) $[R_4R_3PBR_1R_2]_nA$,
(3) $[R_2R_1BP(R_3)R(R_3)PBR_1R_2]_n$,
(4) $[R_4R_3PBR_1R_2]_m[R_3PBR_1]_z$, mixtures and copolymers thereof, wherein, $R_1$ and $R_2$ are each independently selected for each monomeric unit from the group consisting of monovalent hydrogen, lower alkyl, phenyl, lower alkyl substituted phenyl, and cycloalkyl substituents having from 5 to 6 annular carbon atoms; at least one of said $R_1$ and $R_2$ being hydrogen in each of said polymers (1), (2), (3) and (4);

$R_3$ and $R_4$ are selected for each monomeric unit from the group consisting of two independently selected monovalent, lower alkyl, phenyl, lower alkyl substituted phenyl, and cycloalkyl substituents having from 5 to 6 annular carbon atoms, and taken together, one single bivalent lower alkylene, phenylene, lower alkyl substituted phenylene, and cycloalkylene substituents containing from 5 to 6 annular carbon atoms;

R is selected from the group consisting of bivalent lower alkylene, phenylene, lower alkyl substituted phenylene, and cycloalkylene substituents containing from 5 to 6 annular carbon atoms;

$n$ is an integer ranging from 2 to 3,000 and is indicative of the degree of polymerization of said polymers;

$m$ and $z$ are integers the ratio of which ranges from about 0.1 to 1 to about 6 to 1, and is indicative of the degree of ring fusion in said polymer (4);

A is a basic terminating group having the formula —$D(R_3)_3$, wherein D is selected from the group consisting of phosphorous and nitrogen; with (II) the electropositive iodine compound N-iodosuccinimide; and (c) recovering said B-iodophosphinoborine polymer.

12. Process for the production of a B-bromophosphinoborine polymer comprising:
(a) admixing and (b) reacting
(I) a B-hydridophosphinoborine polymer selected from the group consisting of:
(1) $[R_4R_3PBR_1R_2]_n$,
(2) $[R_4R_3PBR_1R_2]_nA$,
(3) $[R_2R_1BP(R_3)R(R_3)PBR_1R_2]_n$,
(4) $[R_4R_3PBR_1R_2]_m[R_3PBR_1]_z$, mixtures and copolymers thereof, wherein, $R_1$ and $R_2$ are each independently selected for each monomeric unit from the group consisting of monovalent hydrogen, lower alkyl, phenyl, lower alkyl substituted phenyl, and cycloalkyl substituents having from 5 to 6 annular carbon atoms; at least one of said $R_1$ and $R_2$ being hydrogen in each of said polymers (1), (2), (3) and (4);

$R_3$ and $R_4$ are selected for each monomeric unit from the group consisting of two independently selected monovalent, lower alkyl, phenyl, lower alkyl substituted phenyl, and cycloalkyl substituents having from 5 to 6 annular carbon atoms, and taken together, one single bivalent lower alkylene, phenylene, lower alkyl substituted phenylene, and cycloalkylene substituents containing from 5 to 6 annular carbon atoms;

R is selected from the group consisting of bivalent lower alkylene, phenylene, lower alkyl substituted phenylene, and cycloalkylene substituents containing from 5 to 6 annular carbon atoms;

$n$ is an integer ranging from 2 to 3,000 and is indicative of the degree of polymerization of said polymers;

$m$ and $z$ are integers the ratio of which ranges from about 0.1 to 1 to about 6 to 1, and is indicative of the degree of ring fusion in said polymer (4);

A is a basic terminating group having the formula —$D(R_3)_3$, wherein D is selected from the group consisting of phosphorous and nitrogen; with (II) the electropositive bromine compound 1,3-dibromo-5,5-dimethylhydantoin; and (c) recovering said B-bromophosphinoborine polymer.

13. Process for the production of a B-chlorophosphinoborine polymer comprising:
(a) admixing and
(b) reacting
(I) a B-hydridophosphinoborine polymer selected from the group consisting of:
(1) $[R_4R_3PBR_1R_2]_n$,
(2) $[R_4R_3PBR_1R_2]_nA$,
(3)) $[R_2R_1BP(R_3)R(R_3)PBR_1R_2]_n$,
(4) $[R_4R_3PBR_1R_2]_m[R_3PBR_1]_z$, mixtures and copolymers thereof, wherein, $R_1$ and $R_2$ are each independently selected for each monomeric unit from the group consisting of monovalent hydrogen, lower alkyl, phenyl, lower alkyl substituted phenyl, and cycloalkyl substituents having from 5 to 6 annular carbon atoms; at least one of said $R_1$ and $R_2$ being hydrogen in each of said polymers (1), (2), (3) and (4);

$R_3$ and $R_4$ are selected for each monomeric unit from the group consisting of two independently selected monovalent, lower alkyl, phenyl, lower alkyl substituted phenyl, and cycloalkyl substituents having from 5 to 6 annular carbon atoms, and taken together, one single bivalent lower alkylene, phenylene, lower alkyl substituted phenylene, and cycloalkylene substituents containing from 5 to 6 annular carbon atoms;

R is selected from the group consisting of bivalent lower alkylene, phenylene, lower alkyl substituted phenylene, and cycloalkylene substituents containing from 5 to 6 annular carbon atoms;

$n$ is an integer ranging from 2 to 3,000 and is indicative of the degree of polymerization of said polymers;

$m$ and $z$ are integers the ratio of which ranges from about 0.1 to 1 to about 6 to 1, and is indicative of the degree of ring fusion in said polymer (4);

A is a basic terminating group having the formula $-D(R_3)_3$, wherein D is selected from the group consisting of phosphorous and nitrogen; with (II) the electropositive chlorine compound phosphorus pentachloride; and (c) recovering said B-chlorophosphinoborine polymer.

References Cited by the Examiner
UNITED STATES PATENTS 3,025,326   3/1962   Burg et al. _____ 260—2

TOBIAS E. LEVOW, *Primary Examiner.*

JOSEPH R. LIBERMAN, *Examiner.*